United States Patent [19]
Burnett

[11] Patent Number: 5,512,014
[45] Date of Patent: Apr. 30, 1996

[54] TENDERIZING POULTRY MEAT THROUGH ELECTRICAL STIMULATION

[76] Inventor: Bertram B. Burnett, Box 1280, R.R. 4, Nacogdoches, Tex. 75961

[21] Appl. No.: 212,231

[22] Filed: Mar. 14, 1994

[51] Int. Cl.⁶ .............................. A22C 9/00; A22B 3/06
[52] U.S. Cl. ................................ 452/141; 452/58
[58] Field of Search .................. 452/58, 57, 59, 452/141

[56] References Cited

U.S. PATENT DOCUMENTS

| | | | |
|---|---|---|---|
| 2,621,362 | 12/1952 | Cosden | 452/58 |
| 2,879,539 | 3/1959 | Cervin | 452/58 |
| 3,474,490 | 10/1969 | Groover et al. | 452/59 |
| 4,153,971 | 5/1979 | Simonds | 452/59 |
| 4,495,676 | 1/1985 | Hartmetz, II | 452/141 |
| 4,561,149 | 12/1985 | Nijhuis | 452/141 |
| 4,675,947 | 6/1987 | Clatfelter et al. | 452/141 |

FOREIGN PATENT DOCUMENTS 3604738  8/1987  Germany .................. 452/58

Primary Examiner—Willis Little
Attorney, Agent, or Firm—Fulbright & Jaworski

[57] ABSTRACT

An apparatus and method for automatically electrically stimulating poultry carcasses in poultry processing plants in order to tenderize the poultry meat are disclosed. Carcasses suspended by shackles from a moving processing line are transported between two electrical conductive bars, which are positioned to apply the electrical stimulation across the breast of the suspended carcass. The carcasses are subjected to almost constant electrical stimulation for 8 to 13 seconds by the application of an intermediate level, 100% duty cycle, AC voltage for the period of stimulation.

15 Claims, 6 Drawing Sheets

TENDERIZING POULTRY MEAT THROUGH ELECTRICAL STIMULATION

BACKGROUND OF THE INVENTION

1. Field of the Invention

The present invention relates generally to processing poultry for human consumption, and, in particular, to a method and apparatus for automatically electrically stimulating poultry carcasses in poultry plants in order to tenderize the poultry meat.

2. Description of the Prior Art

The consumer demand for poultry in recent years has shifted from fresh, whole carcasses to fresh, cut-up poultry and other processed poultry products. Due to the muscle tensioning associated with rigor mortis, poultry carcasses are having to be aged four to six hours to obtain poultry breast meat which is sufficiently tender for human tastes. Additionally, the costs of deboning non-aged poultry are much higher than aged poultry. Because deboning non-aged poultry carcasses or storing poultry carcasses for a lengthy aging period to obtain tender poultry meat are both expensive, and because storing increases the risk of microbial growth and decomposition, numerous studies have been conducted in an effort to find a way to accelerate the aging process.

One line of investigation has been directed toward the electrical stimulation of chicken carcasses promptly after their slaughter as a result of some degree of acceptance of electrical stimulation of beef carcasses in the meat-packaging industry to accelerate the aging process. Wide disagreement, however, continues to exist within the beef industry over the specific type of electrical stimulation that is best.

Broadly speaking, three general types of electrical stimulation have received some acceptance in the meat-packing industry. In one approach, pulses in excess of 1000 volts are applied to a carcass rubbing against an electrified rail. In a second approach, high voltage pulses are applied across the hind legs of the beef carcass. In both of these approaches, electrical stimulation occurs in excess of 90 seconds and in some instances for several minutes. In a third approach, a series of low voltage pulses on the order of 20 volts are applied through a rectal probe for at least 90 seconds. In these methods, the periods of high current flow have been kept small in comparison to the spacing between the pulses to minimize or avoid burning the meat. Due to the differences in size and meat composition, and biochemical and physiological differences in the nerve and muscle systems of beef and poultry, such approaches provide little guidance for the poultry processing industry.

As discussed in "Electrical Stimulation in Poultry, A Review and Evaluation" by Yanblin Li, T. J. Siebenmorgen, and C. L. Griffis, 1993 *Poultry Science*, numerous laboratory studies of electrical stimulation of poultry meat have been conducted since 1960, with most of the activity involving chickens conducted since 1986. Although numerous different voltages, currents, and stimulation times have been used in such studies, most have been directed to the use of high voltage pulses above 440 volts separated by periods of no stimulation, as exemplified by "Fragmentation, Tenderness and Post-Mortem Metabolism of Early-Harvested Broiler Breast Fillets From Carcasses Treated with Electrical Stimulation and Muscle Tension" by S. G. Birkhold and A. R. Sams, 1993 *Poultry Science*, March 1993.

The studies to date relating to the electrical stimulation of poultry have been inconclusive because the optimum electrical parameters, the electrical properties of poultry meat, and the biochemical and physiological responses of poultry nerve and muscle systems to electrical stimulation have not been know. Further, there has yet to be developed a practical method of automatically electrically stimulating poultry meat in poultry processing plants in order to effectively tenderize poultry breast meat without additional aging of the poultry carcasses in storage areas at the plant site.

SUMMARY OF THE INVENTION

Accordingly, it is an object of this invention to provide an apparatus and method of electrically stimulating poultry carcasses in order to tenderize the poultry meat.

It is another object of the present invention to provide an apparatus for automatically stimulating poultry carcasses as they are being processed in a poultry processing plant.

It is yet another object of the invention to provide for a method of electrically stimulating poultry carcasses to substantially reduce the aging time of processed poultry meat.

In carrying out these and other objectives of the invention, there is provided a method of electrically stimulating a poultry carcass to tenderize poultry meat wherein an intermediate-level voltage is applied to the poultry carcass which is capable of supplying a substantially constant source of energy to the poultry carcass for a predetermined time period. Preferably, a constant AC voltage of between 110 and 250 volts is applied across the breast of the carcass for approximately 8–13 seconds.

An apparatus for carrying out the method of this invention includes electrically conductive bars across which the intermediate-level voltage is applied and which are positioned in a contacting relationship with a portion of the carcasses as they are transported along the processing line after being slaughtered. The conductive bars are of sufficient length to insure that a substantially constant source of energy is supplied to a carcass for a sufficient period of time to tenderize the poultry meat.

BRIEF DESCRIPTION OF THE DRAWINGS

FIG. 3b is a side view of the alternative embodiment shown in FIG. 3a.

DESCRIPTION OF THE PREFERRED EMBODIMENT

Figure 1:
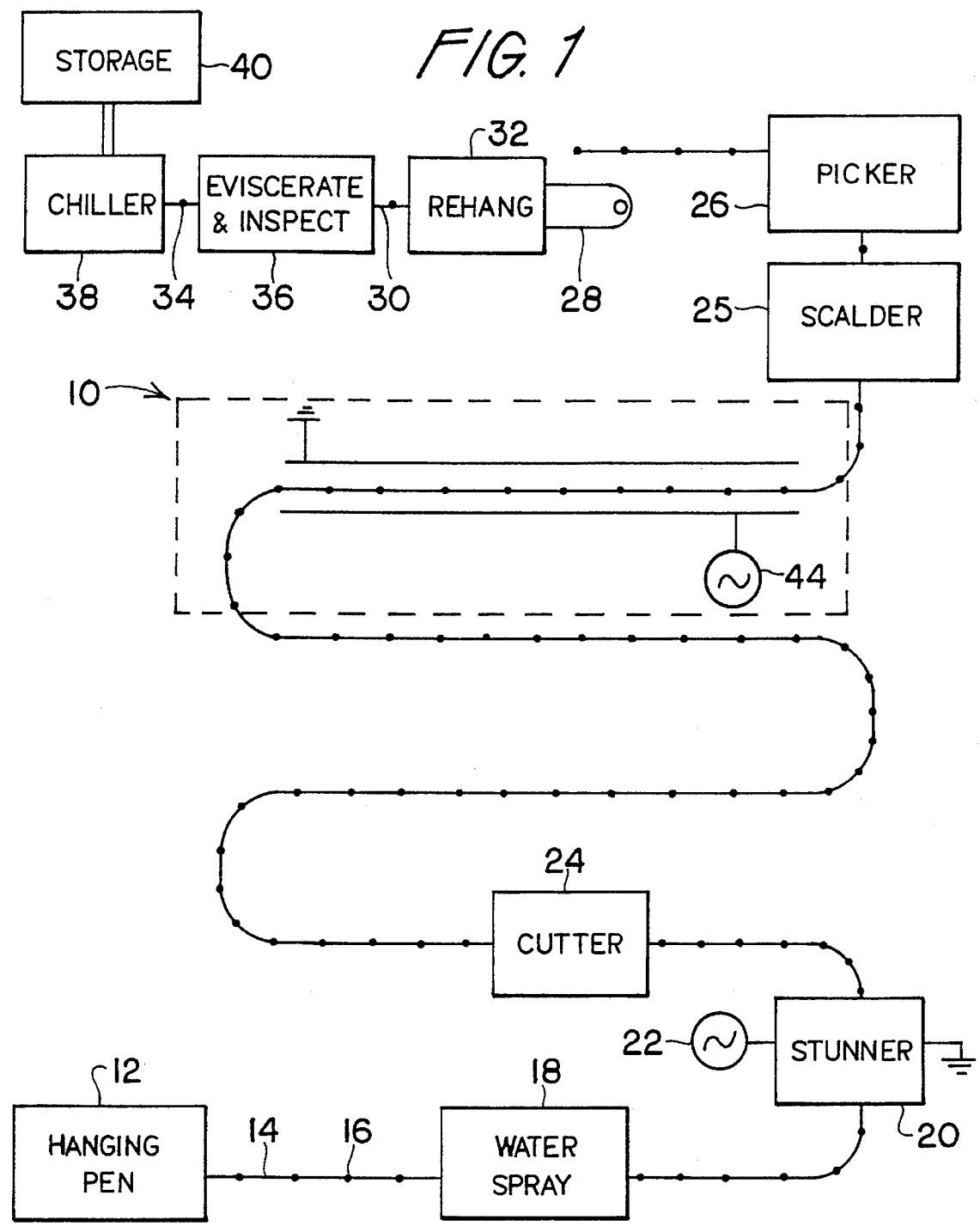
FIG. 1 is a schematic diagram of the processing steps in a poultry processing plant which has been modified in accordance with the present invention.

The invention will now be described in more detail with reference to the various Figures. FIG. 1 illustrates the processing steps of a typical poultry processing plant which have been modified by the addition of apparatus 10 for automatically electrically stimulating poultry carcasses in accordance with the present invention. Poultry, such as chickens or turkeys, are first brought to a hanging pen 12 where they are suspended from a moving processing line 14 by suitable support or suspension devices, such as shackles 16. In a typical processing plant having a processing line capacity of 140 birds per minute with shackles 16 spaced 6 inches apart, the processing line travels at 70 feet/min. Hereinafter, the invention will be described in connection with the slaughter and processing of chicken although the present invention is also suitable for the processing of other types of poultry.

Chickens suspended from the processing line are first transported through a water spray 18 which wets the breasts of the chickens. The wetting of the feathers of the chickens by the water spray 18 promotes the electrical stimulation process. The processing line 14 then carries the chickens to a stunner 20 which electrically stuns the chickens to render them unconscious for slaughter. The stunner typically uses a 25 volt AC stunning voltage generated by a conventional AC voltage source 22.

The processing line 14 then carries the chickens by a cutter 24 which cuts the throats of the chickens. The cutter 24 is commonly located at a suitable distance from the stunner 20 so that the stunned chicken is beginning to regain consciousness at the time its throat is cut. This is to insure that the chickens bleed sufficiently.

The processing line then carries the bleeding carcass to the novel apparatus 10 which automatically electrically stimulates the bleeding carcasses C with a substantially constant source of electrical energy from an intermediate voltage source for a predetermined time period, which will be described in more detailed hereinafter. Preferably, the length of the processing line 14 between the cutter 24 and a scalder 25 is sufficiently long for the chickens to bleed for approximately 90 seconds. This is the preferred time period for the electrical stimulation of the carcasses.

Following the electrical stimulation of the chickens, the processing line 14 carries the chickens to a scalder 25 which scalds the chickens with hot water so that the feathers can be easily picked off the carcasses at the picker 26. The processing line then transports the processed carcasses to a conveyor belt 28 onto which they are dropped for rehanging onto a second "clean" processing line 30 at a rehanging station 32. The second processing line 30 also has support or suspension devices 34 from which the chicken carcasses are suspended. The suspended chicken carcasses are then transported through an evisceration process 36 where the carcasses are eviscerated and then inspected by an authorized USDA inspector.

The eviscerated and inspected carcasses are then transported by the second processing line to a cold-water chiller 38 where the processed carcasses are chilled prior to storage in a storage area 40. In the operation of a poultry processing line having a 140 bird/minute processing rate, the carcass of a bird that is initially suspended from a shackle 16 on the processing line 14 at the hanging pen 12 will typically arrive at the storage area approximately one hour later.

Prior to the addition of the apparatus 10 for carrying out the present invention, the chicken carcasses were stored in the storage area 40 for 4 to 6 hours before the chickens were transported to further processing. With the present invention, the chilled carcasses are not stored prior to being processed further. Accordingly, the need for large, expensive storage areas have been eliminated, thereby reducing capital and operating costs of the processing plant while also reducing the potential for microbial growth on the stored carcasses.

Figure 2:
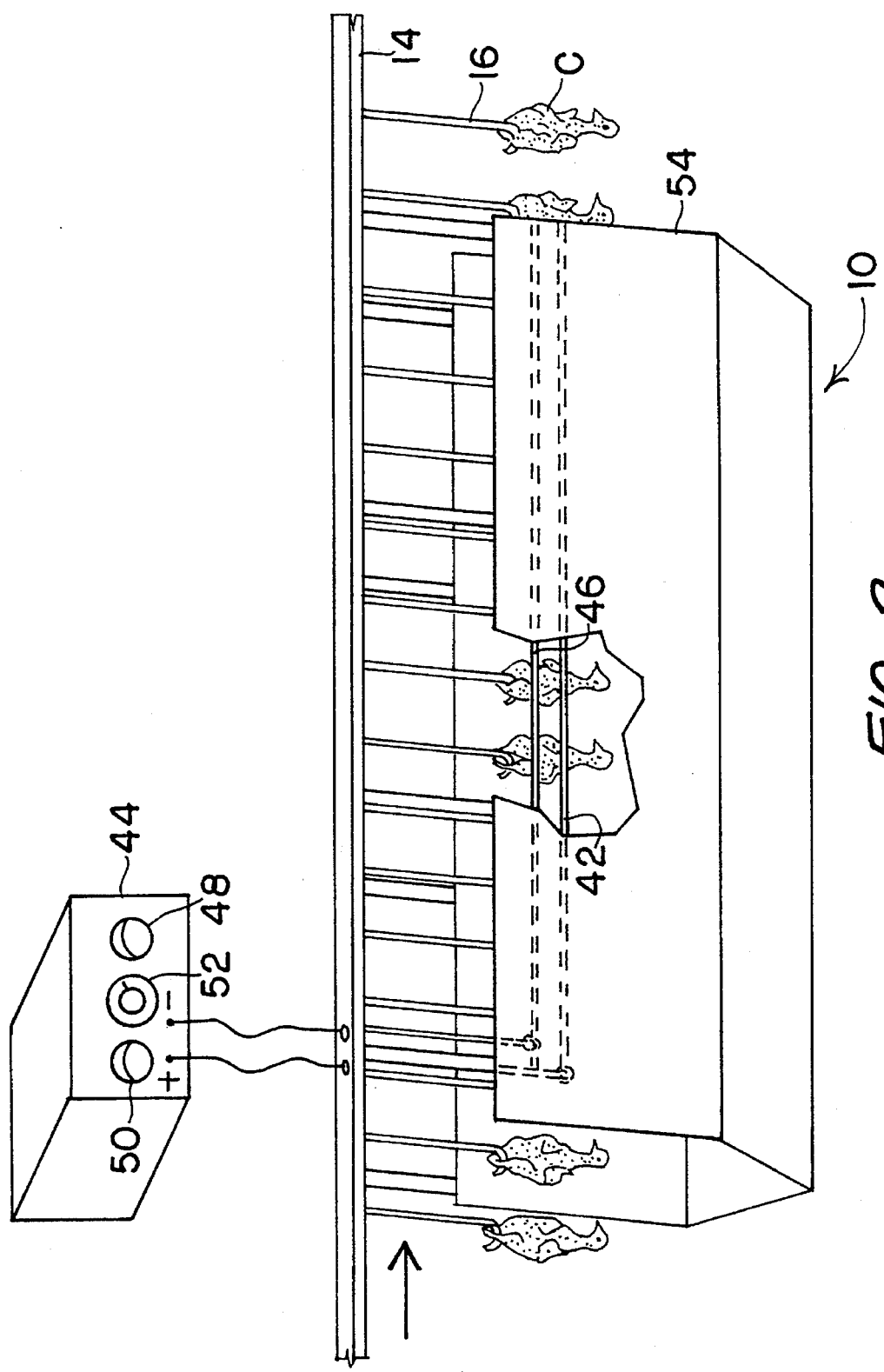
FIG. 2 is an isometric cut-away view of apparatus suitable for carrying out the present invention.

FIG. 2 illustrates the apparatus 10 for automatically electrically stimulating the chicken carcasses C for the predetermined time period as the processing line transports the carcasses C through the apparatus 10. The apparatus includes an electrified conductive bar 42 of suitable length connected to the "hot" terminal of an intermediate voltage source 44 and another conductive bar 46 connected to common or ground terminal of the voltage source 44. The bars 42 and 46 are preferably made from stainless steel. The bars 42 and 46 are positioned below the moving processing line 14 and slightly offset from a vertical plane through the processing line 14 in order for the bars 42 and 46 to remain in a contacting relationship with the chicken carcasses C hanging from the shackles 16 as they are transported through the apparatus 10. The bars are of sufficient length that the bars remain in electrical contact with each carcass for sufficient time to electrically stimulate the carcasses so that the breasts become tender.

The intermediate voltage source 44 may include a voltmeter 48 for monitoring the voltage, an ammeter 50 for monitoring the current and a rheostat 52 for varying the voltage within the desired voltage range. A suitable voltage source 44 is an alternating voltage source capable of generating between 110 and 250 volts and having a duty cycle at or substantially near 100% so that there is a substantially constant transmission of electrical energy through the carcass for the desired tenderizing period. Preferably, the voltage source 44 generates a typical commercial line grade 100% duty cycle, sinusoidal voltage although other types of waveforms having close to a 100% duty cycle may be used. For such intermediate voltages, AC currents between 120 and 500 milliamperes may be expected to pass through each of the chicken carcasses.

Preferably, the carcasses are electrically stimulated by the intermediate AC voltage between 8 and 13 seconds. The particular voltage level and tenderizing period may vary within the above-described voltage range depending on the size and weight of the carcasses and the type of waveform.

For safety reasons, the portion of the processing line 14 having electrically conductive bars 42 and 46 positioned along it is enclosed by a plexiglass shield 54.

Figure 3A:
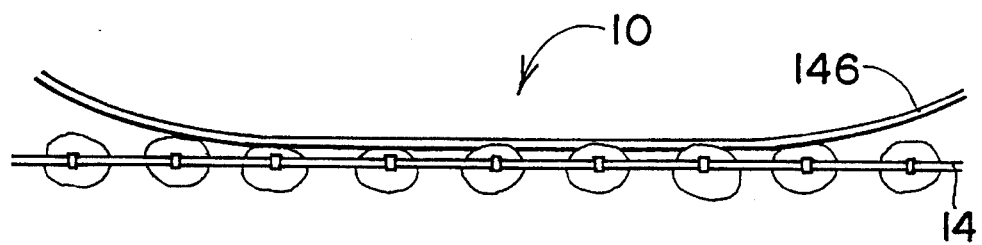
FIG. 3a is a top plan view of an alternative embodiment of the conductive bars of the apparatus for carrying out the present invention.
Figure 3B:
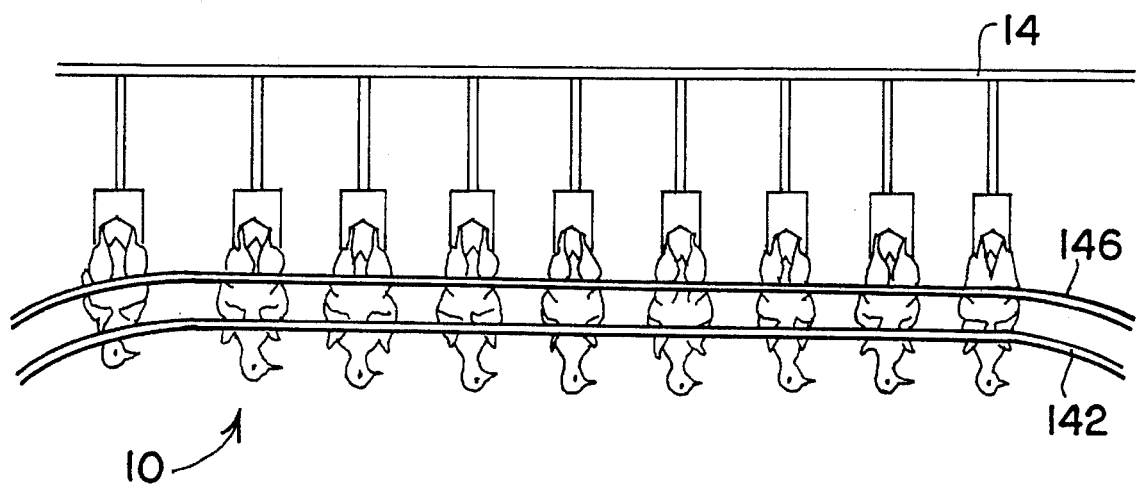

In an alternative embodiment of the apparatus 10 shown in FIG. 3, the apparatus 10 has curved electrically conductive bars 142 and 146 which are curved along the same arc but slightly offset from the vertical plane through the substantially straight processing line 14 so that the carcasses remain in contact with the carcasses moving along the processing path for the desired stimulation period. The curved conductive bars 142 and 146 further separate the carcasses from one another so that they hang more freely against the conductive bars.

Figure 4:
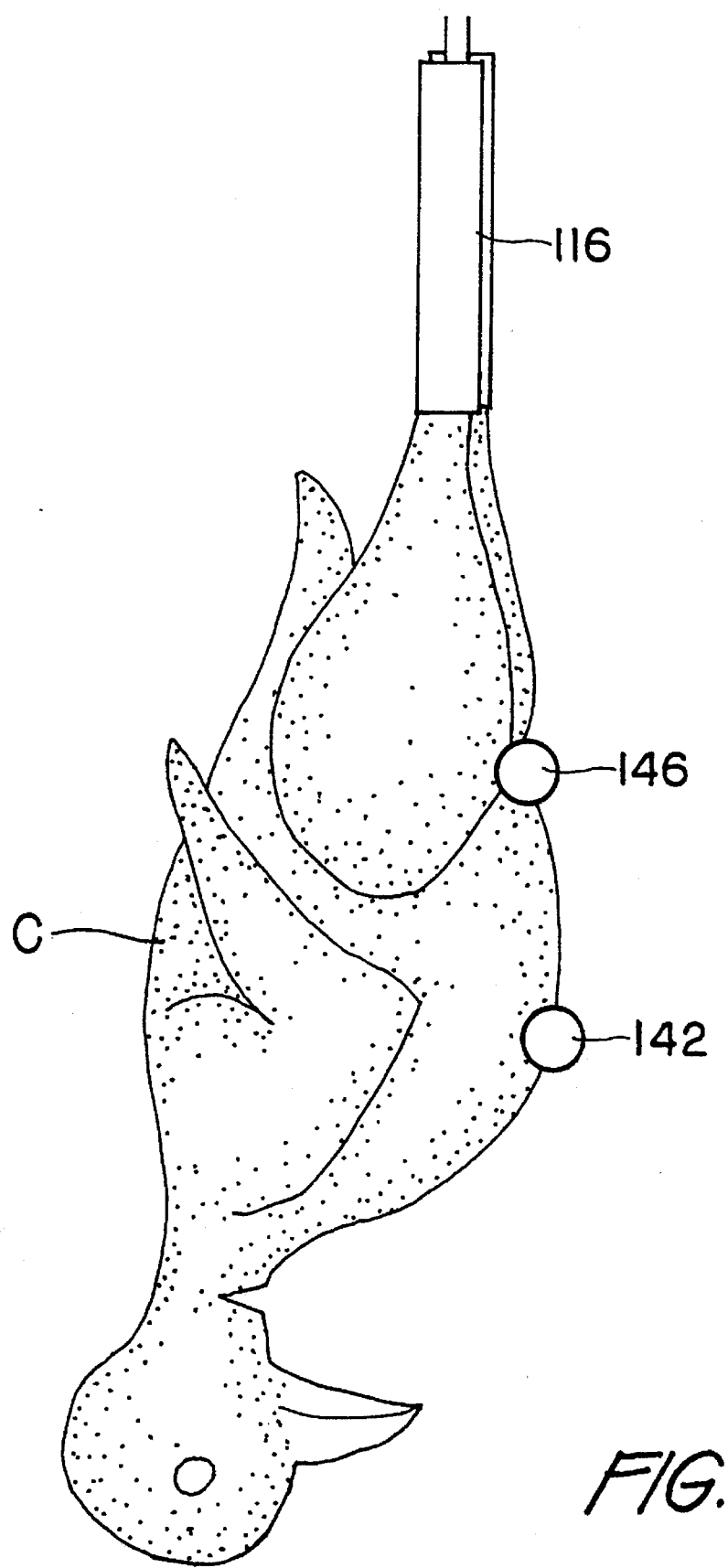
FIG. 4 is a close-up isometric view of a chicken carcass suspended from the shackle portion of the apparatus of FIGS. 2 and 3, the breast portion of which presses against two electrically conductive bars.

FIG. 4 illustrates the points at which the conductive bars 142 and 146 are in electrical contact with the carcass. Preferably, the bars are positioned at the proximate ends of the carcass' breast in order that the current flow is through the breast portion of the carcass.

In operation, the tenderness of various batches of early-harvested chickens processed on a processing line with the stimulation apparatus 10 of the present invention have been compared to similar batches of early-harvested chickens which were processed in a similar manner except for the absence of electrical stimulation. In evaluating the tenderness of the processed chicken carcasses, both a taste test and a shear test were employed.

Figure 5A:
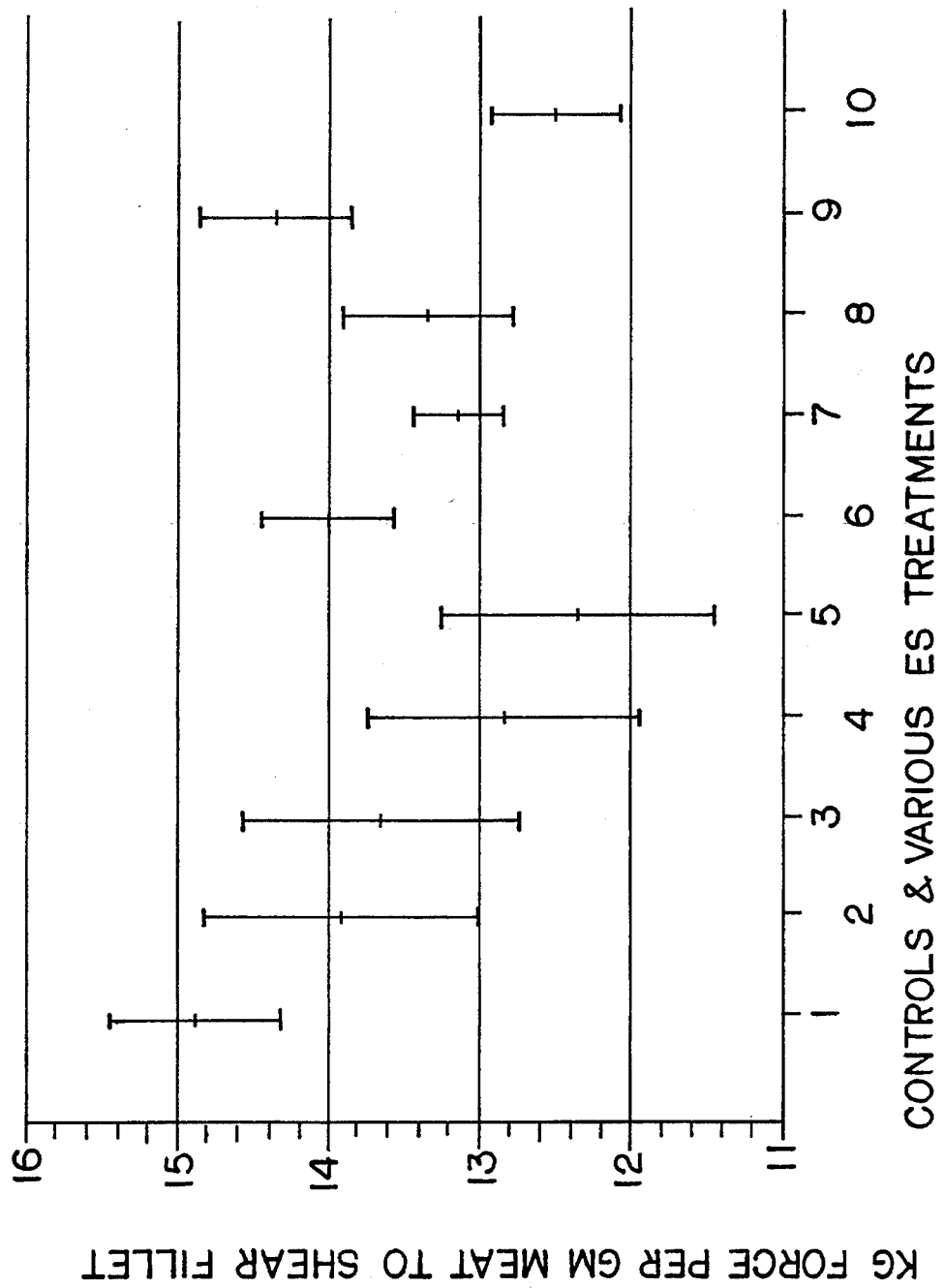
FIG. 5a is a graph showing the shear force values associated with groups of processed poultry carcasses, a portion of which have been electrically stimulated in accordance with the present invention.

FIG. 5a illustrates the resulting shear test values for chickens in various control batches and in various batches subjected to electrical stimulation. In conducting the shear test on control batch labeled 1, the breasts of the processed carcasses were removed from the carcass immediately following the chiller (1 hr. postmortem) and split into two fillets. The fillets were then individually quick frozen, held frozen, thawed overnight in a refrigerator and boiled in water in a sealed waterproof bag, then cooled by water and by refrigeration and then cooked before being sheared using a conventional shear testing machine, such as an Instron Universal Testing Machine. The resulting shear test values were in the range of 14 to 15.5.

Additional control batches 2, 3, 4, and 5 were tested following the same procedures except that 1, 2, 3, and 4 additional hours of aging, respectively, were permitted prior to the meat being quick frozen. As expected, the range of shear values decreased with additional aging to a minimum of 12–13.

FIG. 5a also reflects shear values for batches 6–10 in which the chicken meat was subjected to varying types of electrical stimulation ("ES"). Except as noted below, the processing parameters of the chicken meat for the shear tests are the same as for batch 1.

In batch 6, the carcasses were subjected to electrical stimulation for 9.29 seconds at 150 V AC for a period of 10 seconds on and 0.1 second off (nearly constant electrical stimulation). In batch 7, the carcasses were subjected to ES for 8.86 seconds at 150 V AC at 100% duty cycle (commercial line grade). In batch 8, the carcasses were subjected to ES for 9.29 seconds at 150 V AC at a 100% duty cycle. For batch 9, the carcasses were subjected to ES for 11.36 seconds at 150 V AC at a 100% duty cycle. For batch 10, the carcasses were subjected to ES for 8.86 seconds at 160 V AC at a 100% duty cycle. At a 100% duty cycle, the carcasses are receiving almost constant electrical stimulation.

Figure 5B:
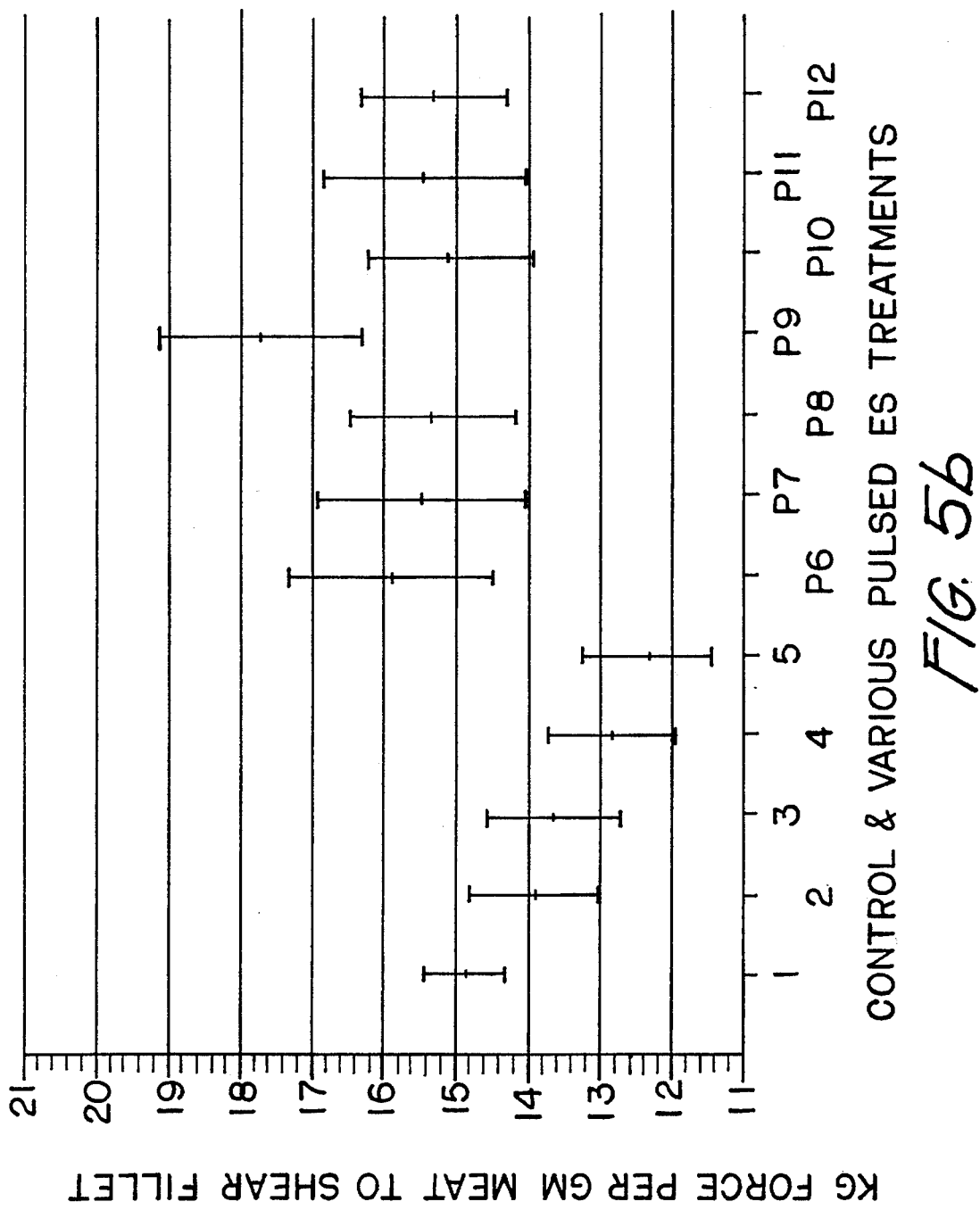
FIG. 5b is a graph showing the shear force values associated with groups of processed carcasses, a portion of which has been electrically stimulated with pulsed voltage.

FIG. 5b shows the measured shear values for the same control batches 1–5 shown in FIG. 5a and also measured shear values for batches P6–P12 of chicken meat which were subjected to pulses of electrical stimulation. Except as noted below, the processing parameters of the chicken meat for the shear tests are the same as those for batches 6–10 in FIG. 5a. In batch P6, the carcasses were subjected to 2 second pulses of 150 volt AC followed by no voltage for 0.5 seconds for a total ES period of 11.14 seconds. In batch P7, the carcasses were stimulated with the same voltage as P6, except the pulse duration was 3 seconds on and 0.5 seconds off. In batch 8, the carcasses were subjected to 2 second pulses of 200 volt AC and then no voltage for 0.5 seconds for a total time period of 11.14 seconds. In batch P9, the carcasses were subjected to 2 second pulses of 400 volts AC followed by no voltages for 0.5 seconds for 11.14 seconds. In batch P10, the carcasses were subjected to 0.1 second pulses of 440 volts AC followed by no voltage for 1 second for 11.14 seconds. In batch P11, the carcasses were subjected to 1.25 second pulses of 150 volt AC followed by 0.1 seconds of no voltage for 11.14 seconds. In batch P12, the carcasses were subjected to 1.25 second pulses of 200 volts AC followed by no voltage for 0.1 seconds for 11.14 seconds.

As the shear test values in FIGS. 5(a) and 5(b) demonstrate, breast meat treated with almost constant electrical stimulation at various intermediate voltages for the time periods indicated were as tender as chicken breast meat aged for several additional hours. Additional shear tests have shown that constant or almost constant ES of chicken carcasses at other voltages between 110 and 250 V AC and between 8 and 13 seconds result in meat more tender than meat processed without electrical stimulation.

The constant or nearly constant electrical stimulation of chicken carcasses with intermediate voltages for a period of between 8 and 13 seconds to tenderize the meat provides for numerous advantages over previous processing methods. First, the yield of high-value breast meat is increased because deboning is easier. In addition, the need for large, expensive storage areas have been eliminated without adversely affecting the taste of the poultry meat, thereby reducing both capital and operating expenses of the processing plant. The reduction in storage time needed to age the meat also reduces the potential for microbial growth on the stored carcasses.

The above disclosure and description of the invention is illustrative and explanatory thereof rather than limiting. Other embodiments and equivalents of the present invention, as defined by the claims, may now be apparent to a person skilled in the art. Accordingly, the claims should be interpreted as covering all embodiments and equivalents which fall within the spirit and scope of the invention.

I claim:

1. A method of electrically stimulating a poultry carcass to tenderize the poultry meat, comprising:

applying an intermediate-level voltage across the breast of a poultry carcass for a predetermined time period, wherein the applied voltage supplies a substantially constant source of electrical energy to the carcass over said predetermined time period; wherein said substantially constant source of electrical energy has a duty cycle of about 100%.

2. The method of claim 1, wherein:

the intermediate-level voltage is a constant AC voltage.

3. The method of claim 2, wherein:

the intermediate-level AC voltage applied to the carcass induces an electrical current in the carcass of between 120–500 milliamperes.

4. The method of claim 1, wherein:

the intermediate-level voltage is a substantially constant AC voltage.

5. The method of claim 1, wherein:

the applied voltage is between 110 volts AC and 250 volts AC.

6. The method of claim 5, wherein:

the voltage is applied continuously to the poultry carcass for a time period between 8 and 13 seconds.

7. The method of claim 1, wherein:

the voltage is applied to the carcass promptly after the slaughter and during bleeding.

8. The method of claim 1, wherein the poultry carcasses comprise chicken carcasses.

9. An apparatus for automatically electrically stimulating poultry carcasses during the processing of such carcasses, comprising:

means for transporting a plurality of poultry carcasses after slaughter along a predetermined processing path;

means for supporting said poultry carcasses in a predetermined position from the transporting means;

electrical energy means positioned along a portion of the transporting means in a contacting relationship with a portion of the poultry carcasses being transported for electrically stimulating the carcasses for a predetermined time period;

said electrical energy means comprising:

a substantially constant source of electrically connected to an intermediate-level voltage source; and a second conductive means electrically connected to ground, wherein said first and second conductive means are in a contact relationship with the portion of each poultry carcass that is moving along the transporting means substantially parallel to the first and second conductive means;

wherein said first and second conductive means comprise first and second conductive bars positioned below the moving line in a contacting relationship with different parts of the breast of the poultry carcasses suspended from the shackle means attached to the moving line.

10. The apparatus of claim 9, wherein:

said transporting means comprises a moving line; and said supporting means comprises shackle means attached to the moving line from which the poultry carcasses may be suspended.

11. The apparatus of claim 9, wherein said conductive bars are curved along arcs which are substantially identical, so that the poultry carcasses are further separated from each other to insure contact with the conductive bars as the carcasses move along the portion of the processing path adjacent to the conductive bars.

12. The apparatus of claim 9, wherein the voltage applied to the poultry carcasses is between 110 volts AC and 250 volts AC.

13. The apparatus of claim 9, wherein the intermediate voltage applied to the poultry carcasses is sufficient to induce an alternating current through the carcasses between 120 and 500 milliamperes.

14. The apparatus of claim 9, wherein the poultry carcasses moving along the processing path are in a contacting relationship with the electrically conductive means for a time period between 8 and 13 seconds.

15. The apparatus of claim 9, wherein the poultry carcasses comprise chicken carcasses.

\* \* \* \* \*

UNITED STATES PATENT AND TRADEMARK OFFICE
CERTIFICATE OF CORRECTION

PATENT NO.   :   5,512,014
DATED        :   April 30, 1996
INVENTOR(S)  :   B. Burnett It is certified that error appears in the above-indentified patent and that said Letters Patent is hereby corrected as shown below:

At column 7, line 1, between "of" and "electrically" insert therebetween -- electrical energy having a duty cycle of about 100 percent; a first conductive means -- .

Signed and Sealed this

Twenty-third Day of July, 1996

Attest:

BRUCE LEHMAN

Attesting Officer     Commissioner of Patents and Trademarks